J. BELLINGHAUSEN.
AGRICULTURAL IMPLEMENT.
APPLICATION FILED AUG. 7, 1916.
1,202,649.
Patented Oct. 24, 1916.
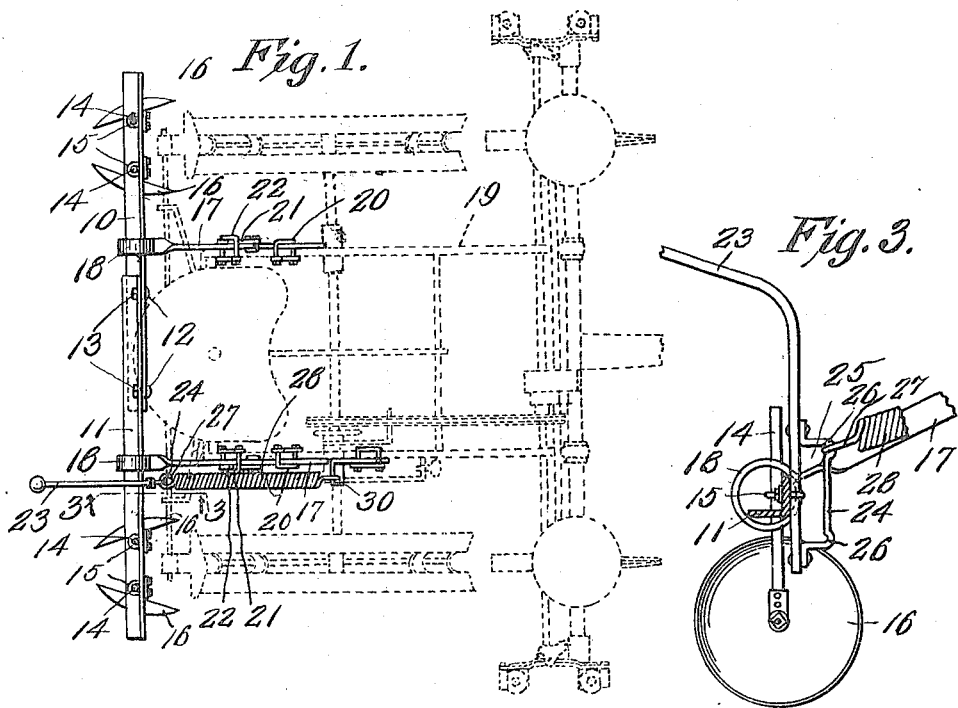
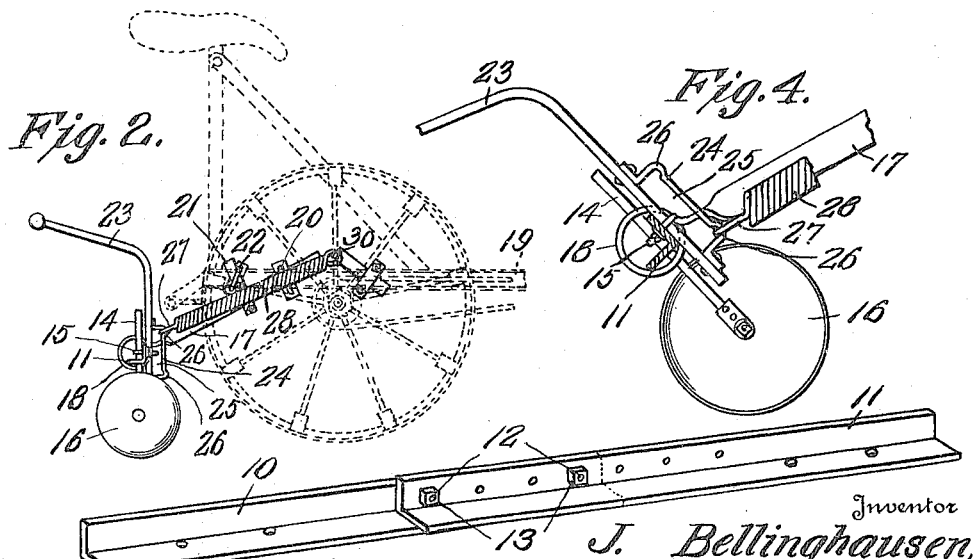

UNITED STATES PATENT OFFICE.

JOHN BELLINGHAUSEN, OF HALBUR, IOWA.

AGRICULTURAL IMPLEMENT.

1,202,649.   Specification of Letters Patent.   Patented Oct. 24, 1916.

Application filed August 7, 1916. Serial No. 113,624.

*To all whom it may concern:*

Be it known that I, JOHN BELLINGHAUSEN, a citizen of the United States, residing at Halbur, in the county of Carroll, State of Iowa, have invented certain new and useful Improvements in Agricultural Implements; and I do hereby declare the following to be a full, clear and exact description of the invention, such as will enable others skilled in the art to which it appertains to make and use the same.

This invention relates to agricultural machinery and has special reference to a disk covering attachment adapted to be used with ordinary corn planters.

One important object of the invention is to provide an improved and simplified device of this character which may be adapted to be attached to any one of the existing corn planters, the device being readily adjustable for this purpose.

A second important object of the invention is to provide a device of this character which is capable of being attached to the usual corn planter and which may be thrown in or out of use at the will of the operator.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and Figure 1 is a plan view of the device applied to a planter, the outline of the planter being shown in dotted lines. Fig. 2 is a side elevation of the device applied to the planter, the planter outline also being shown in dotted lines. Fig. 3 is a section on the line 3—3 of Fig. 1. Fig. 4 is a view similar to Fig. 3 but showing the disks raised from the ground. Fig. 5 is a detail perspective showing the means for adjusting the length of the gang beams.

In carrying out the objects of this invention there is provided a gang bar consisting of angle iron sections 10 and 11 held in adjusted position in regard to their length by means of suitable bolts 12 and nuts 13. Adjustably mounted on the angle sections 10 and 11 are standards 14 which pass through suitable openings in one flange of the respective angle and pass up close to the adjacent flange, being there held in adjusted position by means of suitable clamps 15. These standards support the usual plow disks 16. Intermediate the ends of the gang beams thus formed there is provided a pair of connecting straps 17 which carry at their lower ends circular bearings 18 through which the beam sections pass, these sections being thus rotatable in the bearings 18. These strips 17 are attached to the main frame 19 of the planter by means of suitable clamps 20. Clamped to the members 19 are brace members 21 which are secured to the rear portions of the frame 19 by means of clamps 22. Clamped to the gang beam is a hand lever 23 and secured to the lower end of this hand lever 23 is a guide loop 24 having a longitudinal slot 25 therein provided at each end with a notch 26. These notches 26 are comparatively shallow but are still deep enough to retain the eye 27 of a spring 28, the other end of the spring being secured, as at 30 to a suitable part of the machine. By means of this construction the spring may be held in either end of the member 24 and when held in the upper end of the member 24 in the upper notch 26 will draw the hand lever 23 forward and consequently force the disks into the ground, thus holding them in working position. However, when the spring 28 is held in the lower notch 26, which notch is below the center of rotation of the beam, then the tendency of the spring will be to throw the hand lever 23 backward and raise the disks away from the ground.

From the foregoing it will be obvious that the lengths of the gang beam may be adjusted at will while at the same time the members 18 may be connected to the frame 19 at any desired point and in any desired position so that the beam may be held in proper adjustment relative to the frame 19. In like manner the height of the beam with respect to the ground may be varied at will by properly adjusting the clamps 22 and brace member 21.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. An attachment for planters comprising a pair of connecting straps adapted to be secured to a planter frame and provided with bearings, a gang beam revolubly mounted in said bearings, earth working elements carried by the beam, a lever connected to the beam to revolve said beam and move said elements into and out of engagement with the ground, a spring having one end adapted to be secured in fixed relation to the planter frame, and means connecting the other end of the spring and the beam and arranged to hold said elements in both ground engaging and elevated positions.

2. An attachment for planters comprising a pair of connecting straps adapted to be secured to a planter frame and provided with bearings, a gang beam revolubly mounted in said bearings, earth working elements carried by the beam, a lever connected to the beam to revolve said beam and move said elements into and out of engagement with the ground, a spring having one end adapted to be secured in fixed relation to the planter frame, and means connecting the other end of the spring and the beam and arranged to hold said elements in both ground engaging and elevated positions, said means comprising a bracket fixed with respect to the beam and having a slot extending above and below the axis of rotation of the beam, and provided at each end with a notch, and an eye carried by the spring and movably engaged in said slot to seat in a selected notch.

In testimony whereof, I affix my signature, in the presence of two witnesses.

JOHN BELLINGHAUSEN.

Witnesses:
JOSEPH KOENIG,
WILLIAM KOENIG.

Copies of this patent may be obtained for five cents each, by addressing the "Commissioner of Patents, Washington, D. C."